3,672,874
RECOVERY OF RHENIUM VALUES FROM A SPENT CATALYST
Charles L. Wiley, Blanchard, La., assignor to Universal Oil Products Company, Des Plaines, Ill.
No Drawing. Filed Nov. 12, 1970, Ser. No. 88,993
Int. Cl. C01g 49/00
U.S. Cl. 75—101 R          8 Claims

ABSTRACT OF THE DISCLOSURE

Rhenium values are recovered from a spent rhenium-platinum-alumina catalyst. The catalyst is treated with sulfuric acid to form a rhenium-containing aluminum sulfate solution and a platinum-containing residue. The rhenium-containing solution is passed in contact with the sulfate ionic form of an anionic exchange resin whereby rhenium is absorbed thereon. The rhenium is subsequently eluted from the resin.

---

The present invention relates to the recovery of rhenium from a spent catalyst comprising rhenium in combination with a platinum group metal component and composited with a refractory inorganic oxide carrier material.

A variety of commercially important hydrocarbon conversion processes involving cyclization, dehydrocyclization, isomerization, aromatization, hydrogenation, dehydrogenation, etc., of hydrocarbons have heretofore been effectively catalyzed at varied conditions by catalysts consisting essentially of a platinum group metal composited with a refractory inorganic oxide carrier material. More recently, a rhenium component has been included in the catalyst to form a two component catalyst of improved activity, selectivity and/or stability with respect to one or more of the hydrocarbon conversion reactions.

The catalysts so employed invariably become deactivated and regeneration is required if the catalyst is to perform its intended function in an economical manner. Deactivation may result from any one of a number of conditions peculiar to a particular hydrocarbon conversion process. Usually, deactivation results from an excessive deposition of carbonaceous matter whereby the hydrocarbon being processed is denied access to the active sites of the catalyst composite. While the catalyst can be regenerated with removal of carbonaceous matter by air oxidation, each such regeneration produces a catalyst somewhat less stable than its predecessor. Eventually, regeneration is no longer economically feasible and the spent catalyst must be replaced with a fresh catalyst. The high cost of rhenium and of the platinum group metals, coupled with limited availability, precludes a disposition of the spent catalyst without effecting recovery of substantially all of the rhenium and platinum group metals. This is so although each of the rhenium and platinum group metals may comprise as little at 0.1 wt. percent of the total catalyst composite.

It is an object of this invention to present a novel method for the recovery of rhenium from a spent catalyst comprising rhenium in combination with a platinum group metal on a refractory inorganic oxide base. It is a further object to recover rhenium from a spent catalyst comprising rhenium in combination with platinum on an alumina base, rhenium being recovered in a soluble form for use in the manufacture of fresh rhenium-platinum containing catalysts.

One embodiment of the present invention relates to a method for the recovery of rhenium values from a spent catalyst comprising rhenium and a platinum group metal composited with a refractory inorganic oxide carrier material which method comprises (a) treating the spent catalyst with a strong mineral acid whereby an acidic rhenium-containing solution and a platinum group metal-containing residue are formed; (b) separating said residue and recovering the platinum group metal therefrom; (c) passing the rhenium-containing solution in contact with the sulfate ionic form of an anion exchange resin and effecting adsorption of rhenium thereon; and (d) thereafter recovering the rhenium by elution of said exchange resin.

Other objects and embodiments of this invention will become apparent in the following detailed specification.

Although the further description of the method of this invention is presented with reference to the more commonly encountered platinum-containing catalysts, it is understood that the method can be advantageously applied to recover rhenium values from other platinum group metal-containing catalysts, for example those containing rhenium in combination with palladium, iridium, osmium, rhodium, ruthenium, and the like. Further, the spent catalysts herein contemplated are generally alumina-based catalysts and the subsequent description of the invention is directed thereto. However, it is again understood that rhenium can be similarly recovered from spent catalysts rhenium and a platinum group metal component based on other refractory inorganic oxide carrier materials including silica, zirconium, thoria, boria, alumina-silica, alumina-zirconium, alumina-boria, and the like.

In the practice of this invention, the platinum group metal, e.g. platinum, is recovered from the spent catalyst e.g. rhenium-platinum on alumina, by initially treating the spent catalyst with a strong mineral acid. Preferably, although not necessarily, the spent catalyst is burned free of carbon prior to the acid treatment, suitably at a temperature of from about 575° to about 625° C. in an air atmosphere. Sulfuric acid in a concentration of 35–75% is a particularly suitable mineral acid since the desired reaction is facilitated by heat and sulfuric acid has a boiling point permitting the use of higher temperatures. The reaction can be suitably effected at reflux conditions with the bottom temperature being generally in the 100°–130° C. range, or at a higher temperature at superatmospheric pressures. In most cases, the refractory inorganic oxide, e.g. alumina, will be digested within a period of about 3 hours.

The mixture resulting from the acid treatment of the rhenium-platinum-alumina spent catalyst will comprise an insoluble platinum-containing residue and an aluminum sulfate solution containing a soluble form of rhenium. The platinum-containing residue may or may not contain carbonaceous matter depending on whether or not the carbonaceous matter was burned from the spent catalyst prior to treating the same with sulfuric acid as aforesaid. In any case, the platinum is suitably recovered from the residue on drying and, in the event that carbonaceous matter is present, subjecting the residue to air oxidation at a temperature of from about 400° to about 700° C. or more. The carbon-free residue is further treated in accordance with prior art practice. For example, the platinum-containing residue is reacted with aqua regia in an amount of at least about 1 gallon of total acid per pound of platinum contained in the residue. The aqua regia digestion is effected at a temperature of from about 75° to about 85° C. for a period of from about 1 to about 4 hours. The resulting mixture is filtered and the filtrate recovered and boiled down to remove the solvent and concentrate the resulting chloroplatinic acid. It is generally preferred to recover the platinum as chloroplatinic acid for ease of handling and storage. Also, chloroplatinic acid is a suitable source of platinum and affords a convenient method for utilizing the platinum in the manufacture of fresh catalyst.

Although the rhenium-containing alumina sulfate solution previously separated from the last mentioned platinum-containing residue is predominantly an aluminum sulfate solution containing relatively minute quantities of a soluble rhenium form—probably as perrhenate anions, it has been found that substantially all of said rhenium can be efficiently and economically extracted from said solution utilizing an anion exchange resin—provided that said resin is in the sulfate ionic form. Thus, the rhenium containing aluminum sulfate solution—typically containing as little as 130 p.p.m. rhenium—is passed through conventional ion exchange equipment in intimate contact with a suitable anion exchange resin which is in the sulfate ionic form. Suitable anion exchange resins include the strongly basic anionic exchange resins such as "Dowex 20X8" and related anion exchange resins, and in particular, the quaternary ammonium anion exchange resin commercially available as "Amberlite IRA 410." The commercially available exchange resins may or may not cluding the particular anion exchange resin utilized. In general, the rhenium is suitably adsorbed from the alumina carrier material and said catalyst is treated with sulfuric acid, the resulting rhenium-containing aluminum sulfate solution will contain a very high concentration of sulfate ions. Thus, on processing said solution in contact with the anion exchange resin, usually in the chloride ionic form, said resin will thereby be converted to the sulfate form. However, it is a preferred practice to convert the anion exchange resin to the sulfate form, for example by treatment with about a 7% aqueous sulfuric acid solution, prior to contact with the rhenium-containing solution.

The optimum rate at which the rhenium-containing aluminum sulfate solution is passed in contact with the exchange resin is dependent on a number of variables including the particular anion exchange resin utilized. In general, the rhenium is suitably adsorbed from the aluminum sulfate solution on passing the solution in contact with the exchange resin at a rate of from about 0.1 to about 1.5 gallons per cubic foot of resin per minute. At or immediately prior to the appearance of rhenium in the effluent from the exchange column, i.e., the rhenium break-through point, indicating that the exchange resin has reached its capacity for rhenium, the rhenium-aluminum sulfate charge to the column is terminated and the resin is water-rinsed to remove residual influent solution therefrom. It has been found that after the residual influent solution has been rinsed from the column with water that the remaining traces of sulfate—residual or adsorbed— can be rinsed from the column with about 1 N hydrochloric acid without any appreciable loss of rhenium.

It is to be emphasized that the high concentration of sulfate anions relative to the concentration of rhenium, probably as perrhenate cations, does not preclude the adsorption of rhenium as might be expected. Further, rhenium is subsequently eluted from said exchange resin substantially free of sulfate, particularly when utilizing a halogen acid as the elutriant as hereinafter described.

The adsorbed rhenium is then recovered from the exchange resin by elution, preferably with a halogen acid such as hydrochloric acid, perchloric acid, etc. For example, rhenium is eluted substantially free of sulfate utilizing from about a 5 N to about an 8 N and preferably a 7 N hydrochloric acid solution as the eluant charged to the exchange column at a rate of from about 0.1 to about 1.5 gallons per cubic foot of resin per minute. The rhenium containing effluent is concentrated by the evaporation of excess solvent and the rhenium preferably recovered as a component of the concentrated solution for ease in handling and storage. It is contemplated that the rhenium so recovered exists as perrhenic acid and/or soluble chlorides. In any case, it is preferred to utilize the rhenium in the soluble form recovered as it is compatible with the aforementioned chloroplatinic acid and affords a convenient method for utilizing rhenium in conjunction with platinum in the manufacture of fresh rhenium-platinum catalyst.

Prior to utilization of the anion exchange column for the recovery of further quantities of rhenium, the exchange resin is rinsed with water and thereafter regenerated in the sulfate ionic form in keeping with the practice of this invention.

The following example is presented in illustration of the method of this invention and is not intended as an undue limitation on the generally broad scope of the invention as set out in the appended claims.

A spent rhenium-platinum-alumina catalyst containing about 0.38 wt. percent rhenium, 0.38 wt. percent platinum and 12.5 wt. percent carbon is heated at about 595° C. for 3 hours in air to burn the carbon therefrom. The spent catalyst is thereafter admixed with concentrated sulfuric acid and heated at about 145° C. under 60 p.s.i.g. pressure for about 3 hours. The resulting residue comprising platinum is recovered by filtration. The residue is then digested in aqua regia at about 80° C. The mixture is further filtered and the filtrate boiled down to concentrate the resulting chloroplatinic acid.

The filtrate recovered from the platinum-containing residue contains about 130 p.p.m. rhenium in solution with aluminum sulfate. The filtrate solution is charged downflow through a glass ion exchange column containing 1000 cubic centimeters of anionic exchange resin. The resin is an Amberlite IRA 410 C.P. anionic exchange resin previously treated with two liters of a 7% aqueous sulfuric acid solution and then rinsed with 3 liters of water. 304 liters of the rhenium-containing solution were passed over the resin at a rate equivalent to a liquid hourly space velocity of about 2 with no rhenium breakthrough in the effluent. After rinsing the resin with water followed by 1 N hydrochloric acid, the rhenium is eluted therefrom utilizing about 12 liters of 7 N aqueous hydrochloric solution as the eluant. Rhenium recovery is 99+%.

I claim as my invention:

1. A method for the recovery of rhenium values from a spent catalyst comprising rhenium and a platinum group metal composited with a refractory inorganic oxide carrier material, which method comprises:
    (a) treating the spent catalyst with a strong mineral acid whereby an acidic, rhenium-containing solution and a platinum group metal-containing residue are formed;
    (b) separating said residue and recovering the platinum group metal therefrom;
    (c) passing the rhenium-containing solution in contact with the sulfate ionic form of an anionic exchange resin and effecting adsorption of rhenium thereon; and,
    (d) thereafter recovering the rhenium by elution of said exchange resin.

2. The method of claim 1 further characterized in that said refractory inorganic oxide carrier material is alumina.

3. The method of claim 1 further characterized in that said platinum group metal is platinum.

4. The method of claim 1 further characterized with respect to step (a) in that said mineral acid is sulfuric acid.

5. The method of claim 1 further characterized with respect to step (c) in that said anion exchange resin is a strongly basic anion exchange resin.

6. The method of claim 1 further characterized with respect to step (c) in that said anion exchange resin is a quaternary ammonium anion exchange resin.

7. The method of claim 1 further characterized with respect to step (d) in that said rhenium is eluted from said exchange resin using a halogen acid as the elutriant.

8. The method of claim 1 further characterized with respect to step (d) in that said rhenium is eluted from said exchange resin using from about a 5 N to about an 8 N aqueous hydrochloric acid solution.

References Cited

UNITED STATES PATENTS 3,578,395  5/1971  Kluksdahl et al. ........ 23—20
2,972,531  2/1961  Zimmerley et al. ...... 75—121

GEORGE T. OZAKI, Primary Examiner

U.S. Cl. X.R.

23—20, 23, 50; 75—101 BE, 121; 252—412